(12) United States Patent
Stoimenov

(10) Patent No.: US 10,682,634 B2
(45) Date of Patent: Jun. 16, 2020

(54) METHOD FOR PREPARATION OF MODIFIED CATALYSTS WITH HIGH CATALYTIC PERFORMANCE AND LOW COKING RATE

(71) Applicant: REACTION 35, LLC, Santa Barbara, CA (US)

(72) Inventor: Peter K. Stoimenov, Goleta, CA (US)

(73) Assignee: REACTION 35, LLC, Houston, TX (US)

( * ) Notice: Subject to any disclaimer, the term of this patent is extended or adjusted under 35 U.S.C. 154(b) by 997 days.

(21) Appl. No.: 14/671,258

(22) Filed: Mar. 27, 2015

(65) Prior Publication Data
US 2015/0273449 A1 Oct. 1, 2015

Related U.S. Application Data

(60) Provisional application No. 61/973,667, filed on Apr. 1, 2014.

(51) Int. Cl.
| | | |
|---|---|---|
| *B01J 29/06* | (2006.01) | |
| *B01J 29/48* | (2006.01) | |
| *C01B 39/38* | (2006.01) | |
| *B01J 29/40* | (2006.01) | |
| *B01J 37/08* | (2006.01) | |
| *B01J 37/30* | (2006.01) | |
| *B01J 37/22* | (2006.01) | |

(52) U.S. Cl.
CPC ............ *B01J 29/48* (2013.01); *B01J 29/061* (2013.01); *B01J 29/40* (2013.01); *B01J 37/08* (2013.01); *B01J 37/22* (2013.01); *B01J 37/30* (2013.01); *C01B 39/38* (2013.01); *B01J 2229/16* (2013.01); *B01J 2229/186* (2013.01); *B01J 2229/32* (2013.01); *B01J 2229/34* (2013.01); *B01J 2229/36* (2013.01); *B01J 2229/37* (2013.01); *B01J 2229/40* (2013.01)

(58) Field of Classification Search
CPC . B01J 29/40; B01J 29/48; B01J 29/061; B01J 2229/16; B01J 2229/37; B01J 2229/186; B01J 2229/40; B01J 37/30; B01J 37/22; B01J 37/08

USPC ...................................................... 502/60, 77
See application file for complete search history.

(56) References Cited

U.S. PATENT DOCUMENTS

| | | | |
|---|---|---|---|
| 4,049,573 A | 9/1977 | Kaeding | |
| 5,043,307 A | 8/1991 | Bowes et al. | |
| 7,160,360 B2 | 1/2007 | Wu et al. | |
| 7,964,764 B2 | 6/2011 | Lorkovic | |
| 8,278,493 B2 | 10/2012 | Lorkovic | |
| 8,415,517 B2 | 4/2013 | Gadewar et al. | |
| 2005/0171393 A1 | 8/2005 | Lorkovic | |
| 2008/0255398 A1* | 10/2008 | Stevenson | B01J 29/04 585/407 |
| 2010/0234637 A1 | 9/2010 | Fong et al. | |
| 2011/0071264 A1 | 3/2011 | Nesterenko et al. | |
| 2011/0118518 A1 | 5/2011 | Nesterenko et al. | |
| 2011/0136658 A1 | 6/2011 | Liu et al. | |
| 2014/0005457 A1 | 1/2014 | Spannhoff et al. | |

FOREIGN PATENT DOCUMENTS

| | | |
|---|---|---|
| CN | 101537369 B | 2/2012 |
| WO | 2013123299 A1 | 8/2013 |

OTHER PUBLICATIONS

Machine translation of CN 101537369, Feb. 15, 2012.*
International Search Report and Written Opinion issue is International Application No. PCT/US15/23032, dated Aug. 28, 2015 (8 pages).
Extended European Search Report issued in European Application No. 15772595.3, dated Dec. 18, 2017 (9 pages).

* cited by examiner

*Primary Examiner* — Elizabeth D Wood
(74) *Attorney, Agent, or Firm* — Adolph Locklar

(57) ABSTRACT

A method of manufacturing a modified zeolite catalyst may include reacting a zeolite with a metal salt to form a zeolite/metal salt complex. The zeolite may be a ZSM-5 or ZSM-11. The method may include heating the zeolite/metal salt complex to form an intermediate modified zeolite, and reacting the intermediate modified zeolite with an acid. The method may include ion exchanging the intermediate modified zeolite following the reaction with the acid to form a modified zeolite catalyst.

12 Claims, 4 Drawing Sheets

METHOD FOR PREPARATION OF MODIFIED CATALYSTS WITH HIGH CATALYTIC PERFORMANCE AND LOW COKING RATE

CROSS-REFERENCE TO RELATED APPLICATIONS

This application is a non-provisional application which claims priority from U.S. provisional application No. 61/973,667, filed Apr. 1, 2014, which is incorporated by reference herein in its entirety.

FIELD

The present disclosure generally relates to the modification and use of zeolite catalysts.

BACKGROUND

Zeolites may be modified by certain traditional approaches. Some of these traditional approaches are made to change and control the silicon to aluminum ratio in the zeolite, replace the exchange ion in the zeolite or passivate the surface of the zeolite crystals. Some of the modifications have secondary effects such as change in the acidity of the aluminum centers, in hydrophobicity of the zeolite crystals and in interaction with various other molecules. Such traditional approaches include acid dealumination treatment, hydrogen fluoride treatment, silicon tetrachloride surface passivation, steaming and others.

With respect to dealumination processes, each process results in a particular change to the zeolite structure. For example, steaming, an established method for de-alumination of certain zeolites, results in a gradient of the aluminum concentration across the zeolite crystal, with aluminum highest on the outside of the crystal and lowest in the core. In contrast, dealumination performed with aqueous acid is significantly more uniform. Steaming also leaves a significant amount of extra framework aluminum oxide, which is completely absent in the aqueous acid dealumination.

Zeolite catalysts have been used convert mixtures of methyl bromide and dibromomethane to hydrocarbon products. Often, when methyl bromide/dibromomethane are reacted over zeolite catalysts or zeolite catalysts that have been further processed by $SiCl_4$ surface treatment, traditional dealumination methods such as steaming and steaming followed by acid treatment, acid dealumination by various acids, trimethoxyphosphine treatment, ion exchange and some combinations of the mentioned modification techniques, dibromomethane quickly poisoned the catalyst. This poisoning resulted in a rapid decrease in conversion and coke formed in quantities exceeding the content of dibromomethane in the feed. Consequently, traditionally, it may be necessary to remove dibromomethane from the methyl bromide/dibromomethane stream prior to reaction with the zeolite catalyst.

DETAILED DESCRIPTION

Figure 1:
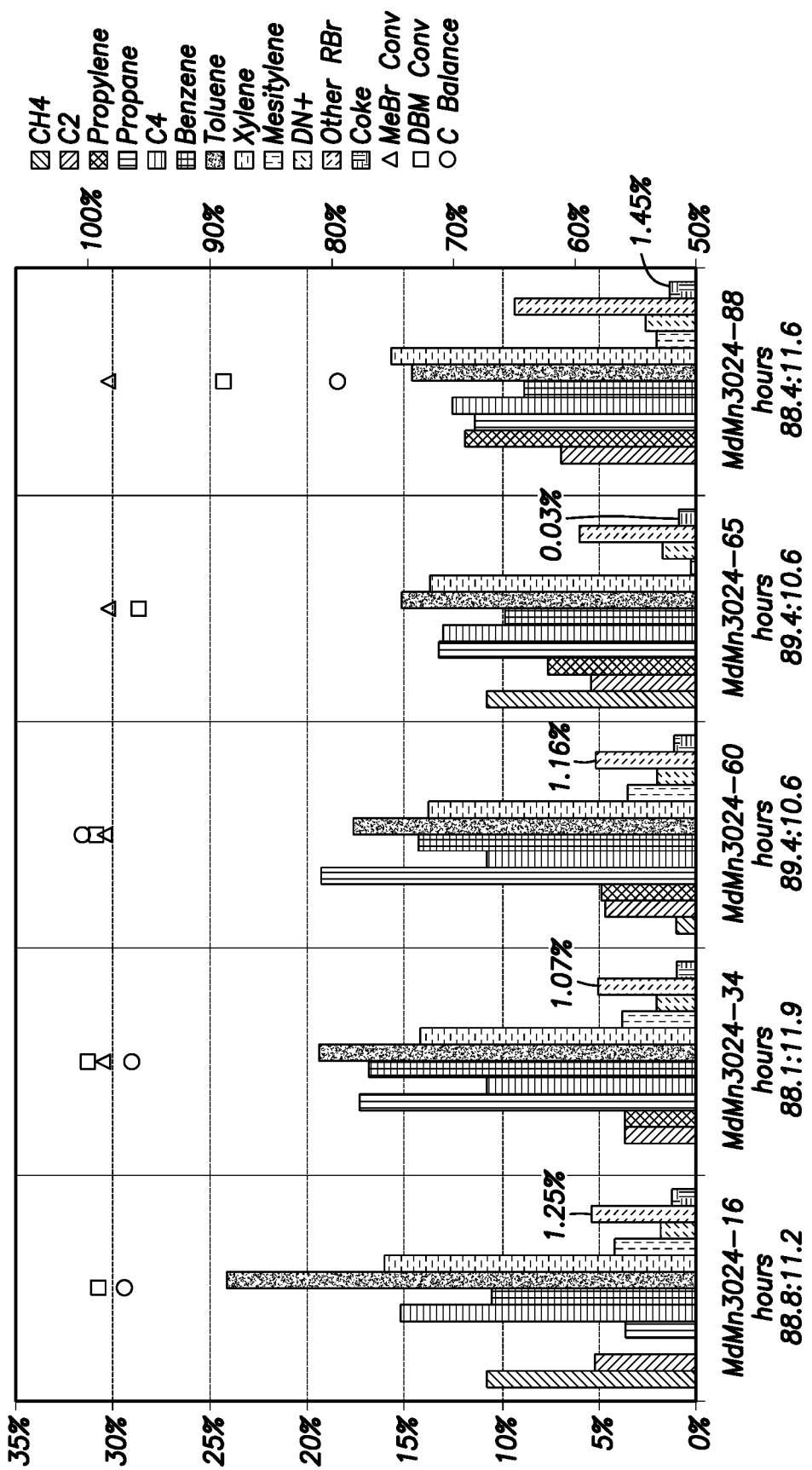
FIG. 1 depicts MD Mn3024 based catalyst product distribution.

The following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

ABBREVIATIONS USED IN THE DISCLOSURE

DBM: dibromomethane, $CH_2Br_2$
MD: The modification procedures described herein; catalysts produced through the modifications described in the present invention (e.g. MD-ZSM-5).
MeBr: bromomethane, $CH_3Br$
ZSM-5: zeolite-silica alumina oxide with MFI structure as defined by international Zeolite Association (IZA)
ZSM-11: zeolite-silica alumina oxide with MEL structure as defined by international Zeolite Association (IZA)
2-PrBr: 2-bromopropane The modifications to the zeolite described in this disclosure are referred to as the MD modifications and zeolites subjected to these modifications are identified by the MD designation (e.g. MD-ZSM-5).

In certain embodiments of the present disclosure, a zeolite is modified in a multi-step process. The multi-step process includes (1) reaction of the zeolite with a metal salt, (2) solid state reaction of the zeolite with the metal salt, (3) removal of excess metal oxide and acid de-alumination, (4) ion exchange, and (5) activation.

Reaction of the Zeolite with a Metal Salt

In certain aspects of the present disclosure, a zeolite is reacted with a metal salt to form a zeolite/metal salt complex. Examples of such zeolites include ZSM-5 and ZSM-11. In some embodiments, the zeolite may be in basic form, such as an ammonium salt, or in hydrogen form. Metal salts are those that are basic, or ones that form a basic metal oxide when thermally decomposed. Examples of such metals salts include Mg and Ca salts. Specific, non-limiting salts include magnesium acetate, magnesium sulfate, magnesium nitrate, magnesium formate, magnesium chloride, magnesium bromide, magnesium iodide, magnesium carbonate, magnesium methylsulfonate, calcium formate, calcium chloride, calcium bromide, calcium iodide, calcium carbonate, and calcium methyl sulfonate.

In certain embodiments, the zeolite is suspended in a solvent in which the metal salt is soluble and the metal salt added to the suspension to form a slurry. In other embodiments, the zeolite may be added to a solution of the metal salt and solvent to form the slurry. The solvent may include any liquid in which the metal salt is soluble, including but not limited to water, alcohols, esters, and amides. In an embodiment, water is used as a solvent. The dissolved metal salt is intimately mixed with the suspended zeolite until the solvent has evaporated. In certain embodiments, the intimate mixing reduces non-homogeneous mixtures, such as mixtures with significantly higher or lower metal salt concentrations as compared to the overall concentration. In other embodiments of the present disclosure, the zeolite and the metal salt are combined as dry powders and heated. Without being bound by theory, it is believed that an ion exchange occurs forming a metal-exchanged zeolite.

The amount of metal oxide employed in the MD modifications preparation can be varied over a large range without detrimentally affecting the performance of the resulting catalyst. In certain embodiments, the metal salt/zeolite may range from 0.1 to 2.0, or from 0.25 to 1.0 (all by weight). Metal salt amounts exceeding 200% of the zeolite (by weight) may lead to excessive zeolite crystal destruction while an amount of metal salt less than 5% of the zeolite (by weight) may result in less desirable performance. In an embodiment of the present disclosure, the metal salt/zeolite ratio is about 0.25.

The amount of solvent and the temperature in the reaction of the zeolite with a metal salt are not critical. Generally, as one of ordinary skill in the art with the benefit of this disclosure will realize, the amount of solvent should be chosen to achieve adequate dispersion of the zeolite slurry and the temperature chosen based on the desired evaporation rate of the water from the slurry.

Solid State Reaction of the Zeolite/Metal Salt Complex

In certain embodiments of the present disclosure, following reaction of the zeolite with the metal salt, the zeolite/metal salt complex are reacted in a solid state reaction to form an intermediate modified zeolite. This reaction is thermally induced at a temperature sufficient to promote salt decomposition and reaction of the subsequent metal oxide with the zeolite. For instance, when the metal salt is magnesium acetate, the reaction temperature should be between 250° C. and 600° C., between 350° C. and 500° C. or about 500° C. At temperatures exceeding 250° C., the acetate decomposes forming magnesium oxide, acetone and carbon dioxide. The basic magnesium oxide reacts at high temperatures with the acidic aluminum and silicon oxides of the zeolite forming inert aluminates and silicates. Some of the magnesium oxide may remain unchanged in excess and not react.

As one of skill in the art will recognize with the benefit of this disclosure, with salts other than magnesium acetate, the reaction temperature may need to be adjusted. The reaction temperature should be sufficiently high temperature to cause the solid state reaction but lower than a temperature that will result in thermal damage to the zeolite, typically around 600° C. The reaction temperatures should be held at a sufficient time to result in both the thermal decomposition of the salt and solid state reaction of the metal oxide with the zeolite. For instance, with magnesium acetate, a reaction temperature of 500° C. may be held for at least 15 minutes.

Removal of Excess Metal Oxide and Acid Dealumination

In certain embodiments of the present disclosure, a dissolution compound may be used to remove any excess metal oxide after the solid oxide followed by a dealumination step. In some embodiments, the dissolution compound may be an acid, for instance a weak acid. After the dissolution of the excess metal oxide, the metal ion may be exchanged for a basic ion, such as an ammonium ion, which decomposes upon heating to form a partially modified zeolite. Following the decomposition, the partially modified zeolite may be subjected to acid dealumination by refluxing with a strong acid. The strong acid can be any strong mineral acid such as HCl, $H_2SO_4$, HBr, or $HNO_3$. When nitric acid is used, the acid concentration may be maintained between 0.05 M to 5 M.

In one embodiment, where magnesium acetate is the metal oxide a weak acid, such as acetic acid, may be used to remove the excess magnesium oxide, but yet control and limit the amount of dealumination. Following the removal of excess magnesium oxide, the zeolite may be treated with $NH_4NO_3$. With wishing to be bound by theory, the $Mg^{2+}$ ion is replaced by an $NH_4^+$ ion, which may decompose upon heating and leave $H^+$ as the cation in the zeolite lattice through release of ammonia ($NH_3$). The partially modified zeolite may then be subjected to acid dealumination by refluxing with nitric acid.

In certain other embodiments of the present disclosure, the metal oxide removal and dealumination may be achieved by a single step of the reaction of the partially modified zeolite by reaction with a strong acid, such as nitric acid. When the single step process is used, it may be possible to reduce the amount of solvent used and use a more diluted nitric acid. In one embodiment, the single step reaction may use a nitric acid strength of approximately 0.1 M.

Ion Exchange of the Modified Product

Following dealumination, the zeolite, now in the H+ form, may be converted to another form through ion exchange methods. In one non-limiting ion exchange method, a zeolite powder in H+ form is dispersed in aqueous solution of the desired metal salt solution such as a nitrate or chloride in a concentration range of about 0.05 to 0.2 molar. The resulting slurry may then be stirred. The solid may then separated from the metal salt solution by centrifugation, filtration or decanting, washed and then dried at. A follow up annealing step by gradually heating in air to about 500° C. for full water removal may optionally be done.

Final Activation

In certain embodiments, a final activation step may be performed to enhance the consistency of the resulting catalyst by decomposing any nitric acid that may remain after dealumination and to remove any trace water adsorbed by the zeolite material. This decomposition/activation may be performed at between 250 and 600° C. or around 500° C.

Following dealumination, the catalyst is considered a "modified" catalyst for purposes of this disclosure.

Catalyst Use

The modified catalysts may act to convert mixtures of methyl bromide and dibromomethane to hydrocarbon products at a low level of coke formation. The modified catalysts may also be used in other applications, such as those where low coking rates are desirable. These applications include, but are not limited to, FCC, hydrocarbon isomerization, and separation of structural isomers.

Modified catalysts prepared in accordance with those of the present disclosure perform substantially different than those prepared through other dealumination methods, rendering the MD catalysts useful in processes where other zeolite catalysts are not. These differences are highlighted in the examples below.

Modified Catalyst Use in Methyl Bromide/Dibromomethane Mixtures

Zeolites such as ZSM-5 or ZSM-11 catalysts may be used to catalyze processes where small hydrocarbons are converted to larger hydrocarbons. For example, methanol or methyl halides (such as methyl bromide) can be converted to a mixture of aromatic and aliphatic hydrocarbons. Zeolite catalyst performance may be judged in these reactions by the product distribution and the coke rate generation. It may be desirable to have a catalyst that facilitates high conversion of the feed with a high yield to the desired product while minimizing the amount of coke that is formed. The formation of coke may be problematic, as coke tends to accumulate on the catalyst and deactivates the catalyst. Once the catalyst is deactivated, it must be regenerated. Consequently, the rate of coke formation may determine how frequently the catalyst is regenerated. Even small differences in coke generation rates can lead to significantly different decoking timetables and thus have a direct economic impact on the hydrocarbon conversion process.

One method for the conversation of methane to fuels is to activate methane by reaction with bromine to form methyl bromide, dibromomethane and hydrogen bromide as major products, such as that described by U.S. Pat. Nos. 7,964,764, 8,415,517, 8,278,493 which are incorporated herein by reference. The methyl bromide may then passed over a zeolite catalyst, such as a ZSM-5 catalyst, to form higher hydrocarbons, such as aromatic compounds and larger aliphatic hydrocarbons and hydrogen bromide. The hydrogen bromide is oxidized with air or oxygen back to bromine which is circulated to react again with the methane feed.

A possible limitation of the methane conversion process described above is the conversion of the dibromomethane formed in the bromination reaction to coke, which may occur rapidly and may require that the catalyst be regenerated with undesirable frequency. Additionally, the conversion of dibromomethane to coke represents an inefficient use of the methane feed stock as coke formation is a carbon loss.

Traditionally, converting a methyl bromide/dibromomethane mixture requires distillation separation of the methyl bromide from dibromomethane followed by reaction the dibromomethane with methane to methyl bromide (reproportionation). This process requires an expensive separation column (high grade materials of construction) and other equipment as well as unfavorable energy loss due to cooling down for the separation from the high bromination temperature followed by heating of the separated methyl bromide and dibromomethane to their respective reaction temperatures. The new catalyst recommended in this disclosure eliminates the need for this costly separation step.

The modified catalysts were found capable of converting both methyl bromide and dibromomethane to products with minimal coke formation, thus avoiding the need for and cost of DBM separation and removal.

Detailed Preparation Procedures

Two non-limiting detailed procedures are shown below for manufacture of examples catalysts.

Procedure 1:

Load 25 g $NH_4$ form 3024 ZSM-5 powder (Zeolyst®) in a crucible and heat to 500° C. ramping at 1° C./min and hold at 500° C. for 2 h.

Mix 25 g H-zeolite material (Zeolyst® CBV 3024E) with 2.90 g Mg-acetate 0.4 $H_2O$ dissolved in 50 ml DI water and heat to 115° C.

Stir the system occasionally until completely dry.

Grind the solid to a powder form.

Heat to 500° C. ramping at 1° C./min and hold at 500° C. for 2 h. Grind the solid to a powder form.

When the solid is cooled, remove the excess Mg-salt by grinding the powder and suspending it in ~60 ml DI water.

Add 20 wt. % acetic acid drop wise until the pH is 5 or lower and stays at that level for 20 min with stirring.

Centrifuge or filter and wash suspension 3 times with DI water (should be no strong acetic acid smell).

Place solid in beaker, with 300 ml 1 M $NH_4NO_3$, and stir with stir bar for at least 12 hours. Centrifuge and wash 3 times with DI water.

Dry at 100° C., then heat to 500° C. ramping at 1° C./min and hold at 500° C. for 2 h.

In a 500 ml round bottom flask add the following: 25 g H-form 3024 MZ+25 ml $HNO_3$ (37 wt %)+250 ml $H_2O$+~2" stir bar Begin stirring and heat at reflux for 2 h (have a condenser on top of the flask)

Centrifuge 3 times, each time decanting off the $HNO_3$ and adding back

Follow this with Mn ion exchange (0.1 M $Mn(NO_3)_2$ with 15 ml liquid/1 g zeolite, stirring for at least 12 h).

The zeolite powder is centrifuged or filtered, washed repeatedly until the pH is 3.5 or higher. The powder is then dried at 95° C. until visually dry.

The material is heated to 500° C. for 2 h ramping @ 1° C./min.

Procedure 2

Mix 25 g $NH_4$-zeolite material (Zeolyst® CBV 3024E) with 2.90 g Mg-acetate 0.4 $H_2O$ dissolved in 50 ml DI water and heat to 115° C.

Stir the system occasionally until completely dry.

Grind the solid to a powder form.

Heat to 500° C. ramping at 1° C./min and hold at 500° C. for 2 h. Grind the solid to a powder form.

In a 500 ml round bottom flask add the following: 25 g H-form 3024 modified zeolite (from the previous step)+8 ml $HNO_3$ (69 wt %)+200 ml $H_2O$+~2" stir bar Begin stirring and heat at reflux for 1 h (have a condenser on top of the flask)

Centrifuge or filter, wash repeatedly until the pH is 3.5 or higher.

The material is heated to 500° C. for 2 h ramping @ 1° C./min.

Examples

A comparison of the performance of an MD-ZSM-5 to unmodified ZSM-5 in the conversion of a stream consisting of methyl bromide and dibromomethane is shown in the following examples.

Preparation of MD H3024

25 g $NH_4$-zeolite material (Zeolyst® CBV 3024E) was mixed with 2.90 g Mg-acetate 0.4 $H_2O$ dissolved in 50 ml DI water and heated to 115° C. The slurry system was mixed occasionally until completely dry. The solid was ground to fine powder. The powder was transferred to a crucible and heated to 500° C. ramping at 1° C./min and held at 500° C. for 2 h. After cooling to room temperature, the material was ground again. The resulting powder was transferred to a 500 ml round bottom flask and 200 ml $H_2O$, 8 ml $HNO_3$ (69 wt %) and a stirring bar were added. The content was refluxed for 1 h, while stirred at all times. The modified zeolite material was filtered and washed repeatedly until the pH was 3.5 or higher. The final material was heated to 500° C. for 2 h ramping @ 1° C./min after air drying.

Preparation of Steamed H3024

12.5 g of H3024 (prepared by heating to 500° C. the stock Zeolyst® $NH_4$ 3024) were dried carefully by heating from 100 to 500° C. by 50° C./h. Once 500° C. was reached, the sample was heated to the desired temperature of either 575 or 625° C. as labeled. A flow of nitrogen was passed through the zeolite at 20 ml/min. When turned on, the nitrogen was passed through a bubbler loaded with water heated to 80° C. for 2, 4 or 8 h as shown in the material description. The sample was cooled down to room temperature and washed with 0.1 M HCl for 1 h at 60° C. (to dissolve the aluminum oxide formed on the outside of the zeolite crystals). The material was washed and dried before use.

Preparation of $SiCl_4$ Treated H3024

12.5 g of H3024 (prepared by heating to 500° C. the stock Zeolyst® $NH_4$ 3024) were dried carefully by heating from 100 to 500° C. by 50° C./h. Once 500° C. was reached, the sample was heated to the desired temperature of either 575 or 625° C. as labeled. A flow of nitrogen was passed through the zeolite at 20 ml/min. When turned on, the nitrogen was passed through a bubbler loaded with silicon tetrachloride heated to 35° C. in oil bath for 1, 1.5 or 2 h as shown in the material description. The sample was cooled down to room temperature and washed with 0.1 M HCl for 10 min. at 60° C. (to dissolve the aluminum oxide formed on the outside of the zeolite crystals). The material was washed and dried before use.

As a baseline, a standard ZSM-5 material was tested. The Mn(II) exchanged ZSM-5 from Zeolyst® CBV 3024, is effective in converting pure methyl bromide to desirable hydrocarbon products at standard reaction conditions. However, when reacted with a MeBr/DBM mixture (reaction temperature 400° C., atmospheric pressure, 2 s residence time over the catalyst, MeBr:DBM=90:10 molar ratio), the catalyst deactivated within 2 h on stream with significant coke formation and the conversion of MeBr and DBM dropped below a 90% threshold.

The MD catalyst material was tested with various amounts of dibromomethane present to determine its activity and efficiency at converting it to desirable hydrocarbon products. Long term runs were made at the same conditions as for Mn3024 until the conversion of either MeBr or DBM dropped below 90%. As shown in FIG. 1, it takes as many 64 h for the conversion to drop below the 90% conversion threshold. Furthermore, the coke amount distributed over the total product distributions showed that the selectivity to coke is well below 2%, indicating that the MD catalyst is a marked improvement over non-modified ZSM-5 based catalyst.

Figure 2:
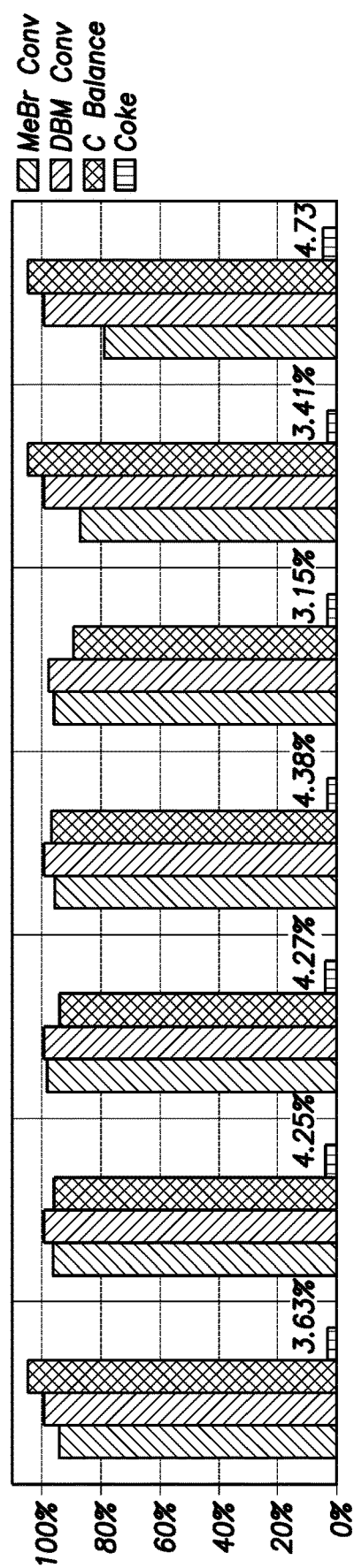
FIG. 2 depicts MD Mn3024 based catalyst product distribution.

Addition of propane and/or propyl bromide was found to be beneficial to all ZSM-5 based catalysts in lowering coke generation rates. Without being bound by theory, it is believed that the propane and propyl bromide act as hydrogen donors. When propane was added to the MeBr/DBM feed, the catalyst lasted for 88 hours before the conversion of MeBr and DBM dropped below the 90% conversion threshold (FIG. 2). The coke amount was a low 1.2% average of the converted carbon.

Other traditionally modified zeolites were prepared and tested in conversion of MeBr/DBM to higher hydrocarbons. The tested examples include several ZSM-5 based modified zeolites which were subjected to steaming and acid wash, silicon tetrachloride vapor treatment for surface only passivation. To improve the performance of the modified ZSM-5 zeolites propane was co-fed in amounts equal to those used for the MD catalyst. The results with steamed and silicon tetrachloride modified CBV3024 are summarized in FIG. 3. For just 2 hours the silicon tetrachloride modified ZSM-5 did not have full conversion of methyl bromide which conversion faltered even more with time (data not shown). The steamed modified ZSM-5 had a full conversion of both methyl bromide and dibromomethane over 2 h run, however the coke generation was in excess of 3.5%, which is more than twice higher than MD H3024.

Figure 4:
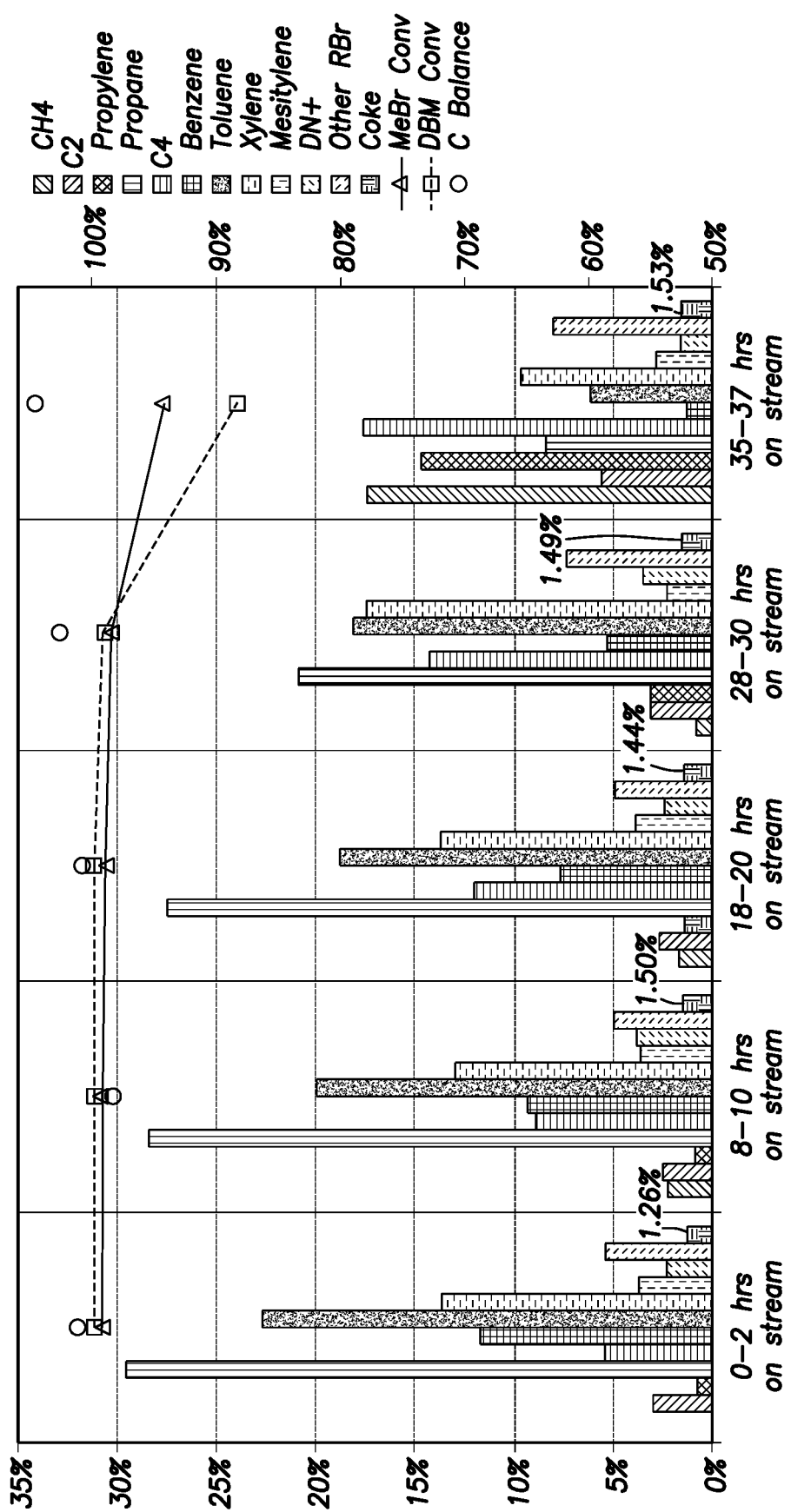
FIG. 4 depicts conversions and product distributions of MD H3024 ZSM-5 catalyst.

Another example of the high performance of the MD H3024 catalyst was an experiment whereby a feed composed of MeBr:DBM=70:30 also contained propane. The catalyst had high methyl bromide and dibromomethane conversion for 36 h and the coke was a very acceptable 1.44%, averaged over the duration of the run (FIG. 4).

FIG. 1. MD Mn3024 based catalyst product distribution. The conversion of MeBr and DBM declines after the 64 h point. Conditions: MeBr:DBM=90:10, T=400° C., residence time 2 s, 5 cm catalyst bed.

FIG. 2. MD Mn3024 based catalyst product distribution. Conditions: MeBr:DBM=90:10, T=400° C., residence time 2 s, Propane:DBM=2:1, data collection time 2 h., 5 cm catalyst bed.

Figure 3:
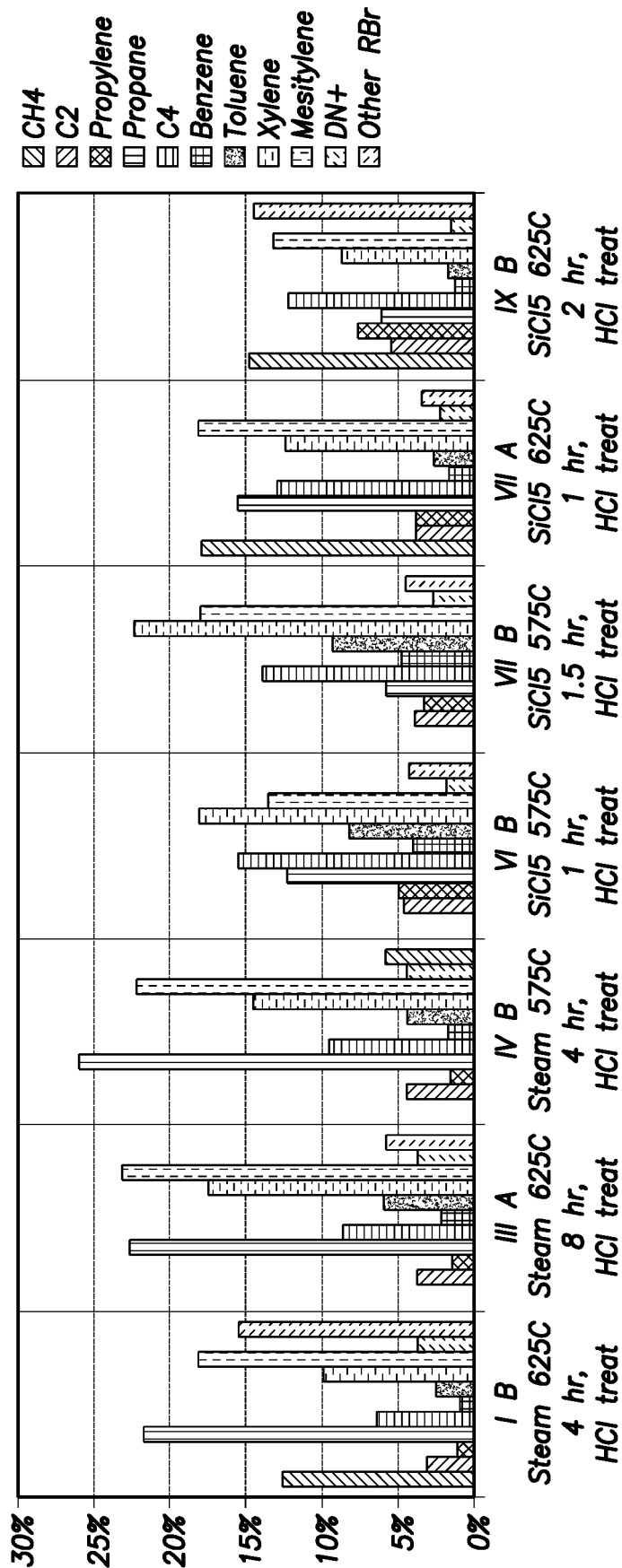
FIG. 3 depicts conversions and product distributions of ZSM-5 catalysts prepared by steaming and silicon tetrachloride modification.

FIG. 3. Conversions and product distributions of ZSM-5 catalysts prepared by steaming and silicon tetrachloride modification. Conditions: 400° C., 2 h run, 2 s residence time, 5 cm catalyst bed, MeBr:DBM=90:10, propane: DBM=2:1

FIG. 4. Conversions and product distributions of MD H3024 ZSM-5 catalyst. Conditions: 400° C., 2 h run, 2 s residence time, 5 cm catalyst bed, MeBr:DBM=70:30, 2-PrBr:DBM=2:1.

The above examples demonstrate possible embodiments of the present disclosure. While the foregoing is directed to embodiments, versions and examples, which are included to enable a person of ordinary skill in the art to make and use the inventions when the information in this patent is combined with available information and technology, the disclosure is not limited to only these particular embodiments, versions and examples. Other and further embodiments, versions and examples may be devised without departing from the basic scope thereof and the scope thereof is determined by the claims that follow.

What is claimed is:

1. A method of manufacturing a modified zeolite catalyst comprising:
    reacting a zeolite, wherein the zeolite is ZSM-5 or ZSM-11, with a metal salt to form a zeolite/metal salt complex;
    heating the zeolite/metal salt complex to form an intermediate modified zeolite;
    reacting the intermediate modified zeolite with an acid; and
    ion exchanging the intermediate modified zeolite following the reaction with the acid to form a modified zeolite catalyst.

2. The method of claim 1, wherein the step of reacting the intermediate modified zeolite with an acid comprises:
    dissolving excess metal oxide with a first acid; and
    dealuminating the intermediate modified zeolite with a second acid.

3. A catalyst formed by the method of claim 1.

4. The method of claim 1, wherein the zeolite is basic or in hydrogen form.

5. The method of claim 1, wherein the metal salt include Mg or Ca.

6. The method of claim 1, wherein the metal salt is magnesium acetate, magnesium sulfate, magnesium nitrate, magnesium formate, magnesium chloride, magnesium bromide, magnesium iodide, magnesium carbonate, magnesium methylsulfonate, calcium formate, calcium chloride, calcium bromide, calcium iodide, calcium carbonate, calcium methyl sulfonate, or combinations thereof.

7. The method of claim 1, wherein the metal salt/zeolite ratio in the zeolite/metal salt complex is between 0.1 to 2.0 (by weight).

8. The method of claim 1, wherein the step of heating the zeolite/metal salt complex to form an intermediate modified zeolite results in a solid state reaction between the zeolite and the metal salt.

9. The method of claim 8, wherein the step of heating the zeolite/metal salt complex to form an intermediate modified zeolite comprises:
    decomposing the metal salt within the zeolite/metal salt complex; and
    reacting a metal oxide with the zeolite.

10. The method of claim 1 further comprising after the step of ion exchanging the intermediate modified zeolite following the reaction with the acid to form a modified zeolite catalyst:
heating the modified zeolite catalyst to form an activated modified zeolite catalyst.

11. The method of claim 10, wherein the step of heating the modified zeolite catalyst to form an activated modified zeolite catalyst is performed at a temperature between 250 and 600° C.

12. The method of claim 1, wherein the zeolite is a ZSM-11.

* * * * *